Nov. 28, 1961    R. J. CANALINI    3,010,548
CORNER REENFORCING CLIP FOR PANEL TRIM
Filed Oct. 8, 1959
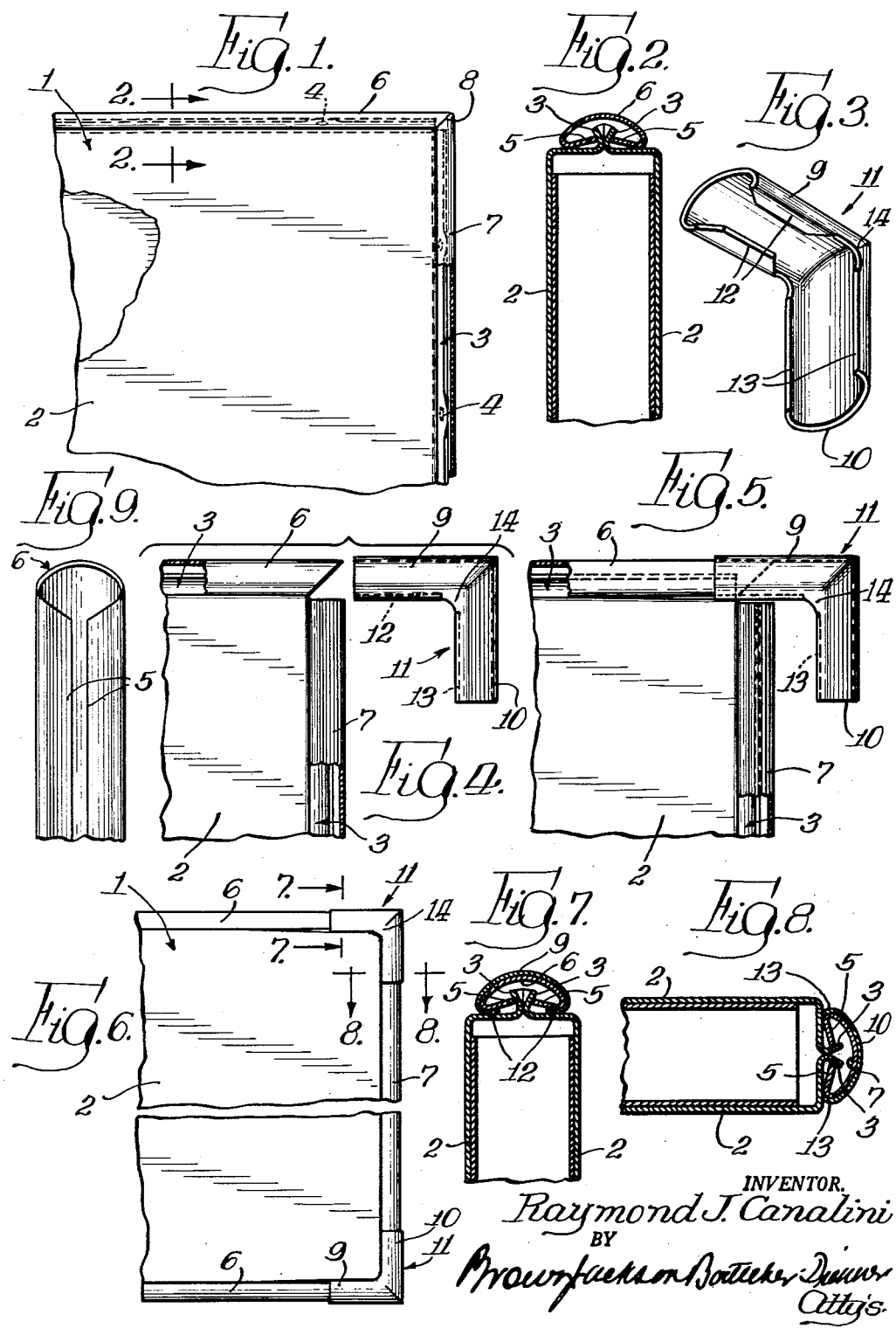
INVENTOR.
Raymond J. Canalini
BY
Brown Jackson Boettcher Dienner
Atty's.

United States Patent Office 3,010,548
Patented Nov. 28, 1961

3,010,548
CORNER REINFORCING CLIP FOR PANEL TRIM
Raymond J. Canalini, Elkhart, Ind., assignor, by mesne assignments, to Honeymead Products Company, a corporation of Iowa
Filed Oct. 8, 1959, Ser. No. 845,278
4 Claims. (Cl. 189—36)

The present invention relates to the construction of panels and more particularly to the corner construction of the trim thereof.

In the construction of toilet, shower and dressing compartments and the like, panels and doors are now constructed of metal sheet spaced by and joined to fiber board cores. The sheets which are employed may be made of various materials and may have various finishes. The following are examples of sheets so used: galvanized steel, cold rolled steel, porcelain coated steel, stainless steel, aluminum, and fabric or plastic covered metal. The corner fitting or corner clip of the present invention is suitable for use with any of the above mentioned materials and yields its advantages without reference to the construction of the body of the panels on which it is mounted, or of which it forms a part.

The sheets of which the panels or doors are formed are generally drawn or otherwise formed to shape, and then filled with a fiber filler and joined together to form the body of the panel or door. The joining of the sheets is preferably effected by the use of integral flanges at the peripheries of the panels or doors, which flanges are secured together at intervals as by welding, mechanical means, locking bars, etc. These flanges are then covered by metal molding strips of arched cross section with inturned flanges. The molding strips are generally, but not necessarily, of the same stock and/or finish as the sheets of the panels. The molding strip which is employed is of generally channel shaped form with a convex cylindrical face to the outside to provide a rounded edge for the panel or door. Such strip is telescopically joined to the flanges of the associated sheets forming the panel or door construction. Such a panel or door construction is of the prior art, and provides the background of the present invention. The joining of the molding at the corners of the doors or panel, according to the prior art, has heretofore been accomplished by a welded, brazed or soldered miter joint of the adjacent ends of the two intersecting moldings. Usually, these moldings extend into intersection at right angles to each other in the plane of the door or panel member.

This miter joint, when carefully done by a skilled workman, presents an attractive appearance. However, the joint has been the source of unusual difficulty. First, certain metals or coated metals present difficulties to brazing or welding. For example, fabric or plastic coated metals are not well adapted to be joined by soldering, brazing, or other applications of heat. Corners joined by soldering, brazing or welding usually have suffered the loss of coatings. For example, where two finish or trim strips of galvanized steel are joined by brazing, the galvanized coating is removed due to the application of heat.

A prime consideration in installing compartments of galvanized or plated metal is to secure extended life of the units by providing resistance to corrosion. Such coatings or plating is expected to result in lower replacement costs and decreasing maintenance expenses. But with known method of welding and grinding, the galvanized coating is burned off during welding and suffers still further in the grinding operations to finish the corners. These actions remove the protection which was intended and which is lost at the critical areas on the units. Furthermore, according to prior art practice, only a skilled workman involving high priced labor can satisfactorily finish a brazed corner. If the job is not skillfully done, the panel may be required to be rejected.

Due to the various sizes and conditions of units required to meet field and building conditions, the production of compartments according to the prior art procedure results in a great deal of hand or special grinding. This grinding, together with the complexities of the various radius surfaces to be finished, places a heavy burden on the mechanic's ability to secure adequately finished appearance of each corner of the unit produced.

It is an object of the present invention to solve this problem of finishing the corner of a wall or door panel employing the usual fiber board core covered with metal sheets and finished on the edges by a metal trim.

It is old to cover the corners of a wooden door or door panels with corner fittings and to fasten the same with nails or screws. Such treatment of the problem here involved is not permissible.

An object of the invention is to apply a corner clip or fitting which will not introduce a weakness in itself or in its attachment to the other parts to be protected or covered. The desired high finish cannot be attained by employing the attaching means of the prior art.

It is an object of the present invention to provide an integral stainless steel corner reenforcing clip, which will cover the corner of the trim with a high finish and a permanent attachment. Stainless steel is preferred, but other high strength, spring metal may be employed.

It is necessary that such a corner finish clip be readily applied, and yet when applied that it be fixedly secured against any ordinary or usual forces which might tend to dislodge it.

In solving this problem, I have devised an integral sheet metal corner clip having two limbs at substantially right angles adapted to embrace the trim strips which meet at the corner of the door or wall panel to be finished. The trim strip need not be fitted accurately by a miter joint, as in the previous requirement for welding or brazing, since they will be spring gripped and held by the two limbs of the fitting or clip. One leg of the clip has relatively wide inturned flanges which extend so far towards each other that this leg can be applied to its trim strip only by a telescopic motion of the two. The other limb of the clip has narrow inturned flanges, so that while the other limb is moved telescopically towards final position on the corner, the short inturned flanges will be sprung apart and snapped over the corresponding trim strip. When so placed and disposed, the clip is permanently in position and will not easily be dislodged.

In order to acquaint those skilled in the art with the manner of constructing and operating an embodiment of my invention, I shall describe, in connection with the accompanying drawings, a specific example of the same.

In the accompanying drawings:

FIGURE 1 is a fragmentary side view of a corner of a panel constructed in accordance with the prior art;

FIGURE 2 is a vertical cross section through the same on the line 2, 2 of FIGURE 1;

FIGURE 3 is an isometric view of the corner reinforcing clip of the present invention;

FIGURE 4 shows the first step in applying the corner fitting to the trim strips according to the present invention;

FIGURE 5 shows the one limb of the corner fitting of FIGURE 3 being telescoped with the corresponding trim strip;

FIGURE 6 is a fragmentary side elevational view showing the upper and lower corners of a door panel having the corner reenforcing clips of my invention applied and in place on the trim strips;

FIGURE 7 is a transverse sectional view taken on the line 7, 7 of FIGURE 6 to show the telescoping relation of one limb of the corner fitting with the corresponding trim strip;

FIGURE 8 is a similar section taken on the line 8, 8 of FIGURE 6 showing the snapped-on relationship of the corresponding limb of the corner fitting and its trim strip; and FIGURE 9 is a bottom plan view of one end of a trim strip, such as is employed in connection with the clip of my invention.

Referring first to FIGURE 1, the panel 1 is made up of two sheets of metal, which may, for example, be formed of galvanized steel. The sheets 2, 2 in this case are substantially identical, being lefts and rights and being formed or drawn with facing flanges 3, 3 which are welded together at spaced points along their length, as indicated at 4 in FIGURE 1, where these flanges are brought into parallelism. Throughout the rest of the perimeter, the flanges are spread away or diverge from each other, as indicated at 3, 3 in FIGURE 2, to form a suitable dovetail to be embraced by the flanges 5, 5 of the cooperating trim strips 6 and 7. According to the prior art, the trim strips are formed with a diagonal or miter cut, as shown in FIGURE 1, to produce the miter joint 8, which, according to the prior art practice, is brazed or welded. The difficulty of making a nicely finished joint at the corner 8 by relying upon brazing and subsequent finishing by grinding and polishing is obvious. As may be seen from FIGURE 9, a diagonal end on each trim strip, such as 6 and 7, facilitates their being assembled endwise with the said flanges 3, 3.

The trim strips 6 and 7 are shown as being narrower than the edge or thickness of the panel 1, as may be seen in FIGURES 2, 7 and 8. The width is optional. The strips may, for example, be as wide as the edge of the panel.

In FIGURE 3 I have shown in isometric view the corner clip 11 of my invention for finishing the corner, as will be explained in connection with FIGURES 4 to 8, inclusive. The corner clip 11 comprises a stamping of stainless steel sheet which material has a high degree of resiliency, resistance to corrosion, and has high strength. While stainless steel is the material of choice, other metals or alloys of suitable properties may also be employed for the clip 11. The clip 11 consists of two limbs 9 and 10, which are of arched cross section, as may be seen in FIGURES 7 and 8. In the preferred form they are at right angles to each other. The limb 9 has a pair of wide inturned flanges 12 which are adapted to extend under the inturned flanges 5, 5 of the strip 6; see FIGURES 5 and 7. The said wide flanges 12, 12 lie between the flanges 5, 5 and the end walls of the panels 2, 2 adjacent to where they meet at the joining flanges 3, 3. The wide flanges 12, 12 lie in substantially a common plane with their free edges extending towards each other. They extend so far toward each other that they cannot be sprung sidewise over the trim strips. As shown in FIGURE 4, assume that the strips 6 and 7 have been telescopically assembled upon the corresponding dovetailed flanges 3, 3 with the end of strip 7 cut off square, i.e., its full width part being below the path of flanges 5, 5 on limb 9. The clip 11 is aligned with the limb 9 in position to telescope with the strip 6, as shown in FIGURE 4, and the clip 11 is then telescopically slid over the strip, as shown in FIGURE 5. The adjacent end of strip 6 may be cut off square if desired. The assembly proceeds by sliding the clip 11 to the left as shown in FIGURE 5. The short flanges 13, 13 on the limb 10 will then encounter the edges of the strip 7. The space between the edges of the short inturned flanges 13, 13 is less than the width of the finished trim strip 7. Hence, these flanges must be moved apart by springing the arched sheet metal limb 10 to snap the said flanges 13, 13 over the corresponding rounded edges of the strip 7. Strips 6 and 7 are alike in cross section, and are of such lengths as are suitable to finish the corresponding edges of the panel. The inturned flanges 12, 12 and the flanges 13, 13 are of less length than the lengths of the corresponding limbs 9 and 10 there being a web 14 which lies at the inner corner and joins the metal of the legs. This web 14 has a curved edge joining the adjacent edges of the sheet metal between the two sets of flanges. This web covers and conceals the corner junction of the trim strips, and it adds strength to the clip against cracking or breaking at the corner of the clip. The web 14 performs its function whether the flanges be of the same width or of different width. As shown in FIGURE 6, the upper and lower corner fittings 11, 11 may be applied in the same manner as described in connection with FIGURES 4 and 5. The advantages which are secured by the above construction and assembly are noteworthy.

The present invention relieves the requirement for careful hand fitting, both in the cutting of the ends of the strip and also in avoiding the necessity for the careful hand work of brazing together the ends of the trim strips and finish grinding and polishing the weld, as has been required in previous constructions. Heretofore, the finish of the corner has depended upon the ability of the workman and the care which he exercised in finishing the welded corner. The application of the corner fitting of the present invention requires no special skills, and a uniformly attractive appearance results from the use of the same. Also, since the protective coating, such as galvanize, is not disturbed by the application of the present fitting, the corner is not subject to deterioration, as is the hand finished welded corner.

The use of the present corner fitting reduces the rejection of manufactured units which previously resulted from poor hand finishing of corners.

No special formation of the ends of the trim strips is required, although for purposes of assembly the inward inclination of the inturned flanges 5, 5 at one end of the strip as shown in FIGURE 9 promotes ease of assembly. Also, this form provides a slightly stronger support for the corner fitting.

Corner reenforcing clips like the clip 11 wherein the flanges of both legs 9 and 10 are of equal width may be employed under appropriate conditions. For situations wherein the clip may be telescoped with the ends of the trim strips 6 and 7, both legs 9 and 10 of the clip may have wide flanges 12, 12. For other situations, particularly where the stresses that are likely to be encountered are less severe, both legs of the clip may employ the narrow flanges 13, 13 and then the clip may be assembled upon the trim strips 6, 7 by springing the clip into place on the meeting ends of both of said trim strips at the corner of the panel.

I do not intend to be limited to the specific details shown and described, except as they are required by the appended claims which define the true scope of the invention.

I claim:

1. In a metal faced panel having a substantially right angle corner and consisting of a pair of dished sheets of metal having flanges registering with and attached to each other, the free edges of said flanges having divergent portions, the improvement which consists of trim strips having cooperating inturned flanges for gripping said panel flanges, two of said strips when applied to said panel flanges being disposed at substantially right angles to each other at the corner of said panel, and an integral corner clip consisting of two limbs at substantially right angles to each other, one limb having relatively deep inturned flanges lying in substantially a common plane with their free edges extending towards each other and being adapted to underlie and grip the corresponding flanges of the trim strip whereby assembly requires telescoping of the trim strip and said one limb and the other limb having relatively shallow inturned flanges whereby assembly with the corresponding trim strip may be performed by springing the shallow flanges laterally over the edges of the corresponding trim strip during telescopic motion of the first limb relative to the trim strip which it embraces.

2. In combination, a pair of trim strips having convex body portions of arched cross section and having inturned flanges, said strips being disposed at substantially right angles to each other, and an integral corner clip being of arched cross section and having limbs substantially at right angles to each other, one limb having integral inturned flanges lying in substantially the same plane and being long enough to underlie said flanges on the corresponding trim strip and to require telescoping of the strip with said limb to assemble said limb and said strip, the other limb of the corner fitting having short inturned flanges which can be sprung and snapped over the sides of the corresponding trim strip.

3. An integral spring metal corner clip for covering trim strips comprising two integral limb portions of arched cross section disposed at right angles to each other, one limb portion having relatively wide inturned flanges lying substantially in a common plane, said flanges being adapted to underlie the cooperating trim strip and to be assembled by telescoping said limb portion with the associated strip, the other limb portion having narrow inturned flanges said latter portion being capable of being assembled with its associated strip by springing said portion and snapping said latter flanges over the latter strip by a motion transverse to said latter strip.

4. In combination with panel sheets having meeting flanges, a trim strip of arched cross section having inturned flanges adapted to grip said panel flanges, said trim strip being substantially narrower than the thickness of the panel formed by said sheets, and a corner clip of stainless steel having integral limbs of arched cross section and having inturned flanges adapted to extend over the lateral edges of said trim strips, the inturned flanges of one limb being wide enough to reach between the inturned flanges of the trim strip and the panel, and the inturned flanges of the other limb being short enough to spring over the edges of the corresponding trim strip.

References Cited in the file of this patent
UNITED STATES PATENTS

| | | |
|---|---|---|
| 2,048,359 | Snell | July 21, 1936 |
| 2,287,079 | Anderson | June 23, 1942 |